(12) United States Patent
Yajima

(10) Patent No.: US 7,320,456 B2
(45) Date of Patent: Jan. 22, 2008

(54) VALVE DEVICE

(75) Inventor: Takeo Yajima, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 11/340,922

(22) Filed: Jan. 27, 2006

(65) Prior Publication Data

US 2006/0169935 A1 Aug. 3, 2006

(30) Foreign Application Priority Data

Jan. 31, 2005 (JP) ............................. 2005-024278

(51) Int. Cl.
*F16K 31/08* (2006.01)
(52) U.S. Cl. ........................ 251/65; 251/63.4; 137/523
(58) Field of Classification Search .................. 251/62, 251/63.4, 63.5, 65; 137/523
See application file for complete search history.

(56) References Cited

U.S. PATENT DOCUMENTS

| 4,705,070 | A | * | 11/1987 | Eidsmore ............... 137/614.21 |
| 4,792,113 | A | * | 12/1988 | Eidsmore ..................... 251/65 |
| 5,445,184 | A | * | 8/1995 | Racine et al. ............... 137/460 |
| 5,807,085 | A | | 9/1998 | Yajima ....................... 417/505 |
| 6,164,322 | A | * | 12/2000 | Najmolhoda et al. ....... 137/540 |

FOREIGN PATENT DOCUMENTS

| JP | 8-285125 | 11/1996 |
| JP | 2003-148353 | 5/2003 |
| KR | 1988-7956 | 8/1988 |
| KR | 0075948 | 8/1993 |

* cited by examiner

*Primary Examiner*—Gregory Huson
*Assistant Examiner*—John K. Fristoe, Jr.
(74) *Attorney, Agent, or Firm*—McCormick, Paulding & Huber LLP

(57) ABSTRACT

A valve element for opening and closing a flow path can be reliably set to an opening position and a closing position. The valve element for opening and closing a communication opening portion communicating with an inflow hole and an outflow hole is provided in a valve receiving chamber formed in a valve block, and a valve magnet is provided in the valve element. A driving magnet can be moved to approach to and separate from the valve element by a pneumatic cylinder. When the driving magnet approaches to the valve element, the valve element moves to a closing position where the communication opening portion is closed. When the driving magnet separates from the valve element, the valve magnet provided in the valve element is attracted to a magnetic member, so that the valve element is kept at an opening position where the communication opening portion is opened.

11 Claims, 6 Drawing Sheets

VALVE DEVICE

CROSS-REFERENCED TO RELATED APPLICATIONS

Applicant hereby claims foreign priority benefits under U.S.C. § 119 from Japanese Patent Application No. 2005-24278 filed on Jan. 31, 2005, the contents of which are incorporated by reference herein.

BACKGROUND OF THE INVENTION

The present invention relates to a valve device opening and closing a flow path using a magnetic force.

In a field such as a technical field for manufacturing a semiconductor wafer, a technical field for manufacturing a liquid crystal substrate, or a technical field for manufacturing a multi-layer wiring board, chemical liquid such as photoresist liquid and alkaline or acidic processing liquid is used. Such chemical liquid is accumulated in a chemical liquid reservoir and, by controlling a valve device provided in a flow path connecting the chemical liquid reservoir and a chemical liquid nozzle, is guided to the chemical liquid nozzle via the flow path to be dropped on a wafer etc. by a predetermined amount at a time.

As described in Patent Document 1 (Japanese Patent Laid-Open Publication No. 2003-148353), a chemical liquid supplying apparatus for sucking the chemical liquid accumulated in the chemical liquid reservoir to discharge it to the chemical liquid nozzle includes one in which a pump chamber is partitioned and formed using an elastic member such as a flexible tube and which has a chemical pump sucking the chemical liquid in the chemical liquid reservoir and discharging it to the chemical liquid nozzle by deforming the elastic member to change a volume of the pump chamber. As described in Patent Document 2 (Japanese Patent Laid-Open Publication No. 8-285125), each of a chemical liquid suction path for connecting the chemical liquid reservoir and the chemical liquid pump and a chemical liquid discharge path for connecting the chemical liquid pump and the chemical liquid nozzle is provided with a valve device that opens and closes a flow path in accordance with a change in a volume of the pump chamber.

SUMMARY OF THE INVENTION

In the case of opening/closing a valve element, by a magnetic force, serving as an opening/closing valve for opening and closing the flow path provided to the chemical liquid suction path and the chemical liquid discharge path of the chemical liquid supplying apparatus, a valve magnet is incorporated in the valve element, so that when the flow path is closed by the valve element, a driving magnet approaches to the valve element by a driving member and when the valve element opens the flow path, the driving magnet separates from the valve element. Accordingly, an opening degree of the valve element obtained when the flow path is opened by the valve element is set in accordance with pressure of fluid in the flow path.

In order to set accurately a fluid flow rate in the flow path, it is necessary to open and close the flow path reliably by moving the valve element to an opening position or closing position and keeping the valve element stable without vibration at these positions.

An object of the present invention is to provide a valve device capable of setting, at an opening position and a closing position by using a magnetic force, a valve element which opens and closes a flow path.

A valve device according to the present invention comprising: a valve block provided with a valve receiving chamber having a communication opening portion for communicating with an inflow hole and an outflow hole for fluid; a valve element incorporated in said valve receiving chamber, moved to a closing position of closing said communication opening portion and an opening position of opening said communication opening portion, and provided with a valve magnet; a driving means for moving a driving magnet to an approaching position where the valve element is driven to one of said opening position and said closing position by making said driving magnet approach to said valve magnet, and a separating position where said driving magnet is made to separate from said valve magnet; and a magnetic member provided in said valve block and attracting said valve magnet to drive said valve element to the other of said opening position and said closing position when said driving magnet arrives at the separating position.

In the valve device according to the present invention, when said driving magnet approaches to said valve magnet, said driving magnet repels the valve magnet to drive said valve element to said closing position, and when said driving magnet separates from said valve magnet, said valve magnet approaches to said magnetic member to drive said valve element to said opening position.

In the valve device according to the present invention, said valve element has a magnet receptacle made of a resin, in which said valve magnet is sealed, and a plurality of projection portions contacting with an inner circumferential face of said valve receiving chamber when said valve element performs opening and closing operations are provided on an outer circumferential face of said magnet receptacle.

In the valve device according to the present invention, said valve element has a magnet receptacle made of a resin, in which said valve magnet is sealed, and an attachment portion fixed to said valve block; said magnet receptacle and said attachment portion are coupled by a plurality of elastic supporting pieces; and a path for fluid is formed between said magnet receptacle and said attachment portion.

In the valve device according to the present invention, said driving means is a pneumatic cylinder driving reciprocably a piston provided with said driving magnet at its tip portion.

In the valve device according to the present invention, the valve device is attached to at least one of an inflow-side flow path and an outflow-side flow path connected to a chemical liquid pump sucking chemical liquid in a chemical liquid reservoir and discharging the chemical liquid to a chemical liquid nozzle by increasing or decreasing a volume of a pump chamber.

According to the present invention, the driving magnet is moved to approach to the valve element provided with the valve magnet to actuate the valve element at one of the opening position and the closing position, and the valve magnet provided in the valve element is attracted to the magnetic member to actuate the valve element at the other of the opening position and the closing position when the driving magnet is moved to separate from the valve element. Therefore, the valve element can be set reliably at the opening position and the closing position.

According to the present invention, by supporting the valve magnet using the magnet receptacle provided with a plurality of projection portions and/or elastic supporting pieces, the valve element can be moved stably between the opening position and the closing position and concurrently vibration generated at the respective positions can be prevented. Therefore, the flow path can be reliably opened and closed in a stable state. The magnet receptacle provided with the elastic supporting pieces does not come in sliding contact with the valve receiving chamber in accordance with opening and closing of the valve element, an occurrence of dust due to the sliding contact is prevented.

DESCRIPTION OF THE PREFERRED EMBODIMENTS

Figure 1:
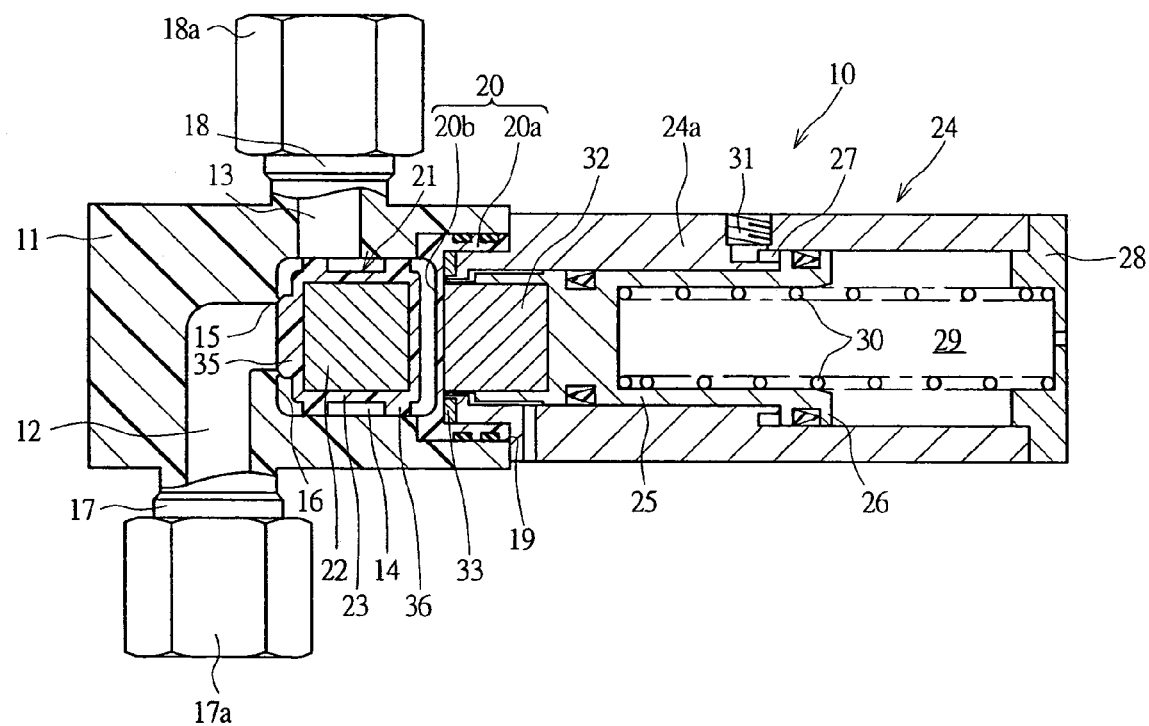
FIG. 1 is a sectional view showing a valve device according to an embodiment of the present invention.

Embodiments of the present invention will be detailed below with reference to the drawings. FIG. 1 is a sectional view showing a valve device according to an embodiment of the present invention.

A valve device 10 has a valve block 11 made of a resin. In the valve block 11, an inflow hole 12 in which chemical liquid flows and an outflow hole 13 from which the chemical liquid flows out are formed, and a valve receiving chamber 14 which communicates with the inflow hole 12 and the outflow hole 13 is formed. An opening portion of the inflow hole 12 located on a side of the valve receiving chamber 14 serves as a communication opening portion 15 for communicating with the inflow hole 12 and the outflow hole 13, and a surrounding area of the communication opening portion 15 serves as a valve seat 16. The valve block 11 is provided with a joint portion 17, to which a pipe for supplying the chemical liquid to the inflow hole 12 is connected, and a joint portion 18, to which a pipe for guiding the chemical liquid from the outflow hole 13 to the outside is connected. Couplings 17a and 18a constituted by nuts are screw-connected to the joint portions 17 and 18, respectively. The inflow hole 12 is connected, by the coupling 17a, to a primary flow path connected to a chemical liquid reservoir or the like while the outflow hole 13 is connected, by the coupling 18a, to a secondary flow path connected to a chemical liquid nozzle or the like.

In the valve block 11, a mounting hole 19 which communicates with the valve receiving chamber 14 and is opposed to the valve seat 16 is formed, and a partition wall cover 20 made of a resin is assembled to the mounting hole 19. The partition wall cover 20 constitutes a portion of the valve block 11, and has a cylindrical portion 20a fitted into the mounting hole 19 of the valve block 11 and a partition wall portion 20b opposed to the valve seat 16.

A valve element 21 is incorporated into the valve receiving chamber 14. The valve element 21 moves the opening position and the closing position. At the closing position, as shown in FIG. 1, the valve element contacts with the valve seat so that it closes the communication opening portion 15. At the opening position, the valve element separates from the valve seat and contacts with the partition wall cover 20 so that it opens the communication opening portion 15. The valve element 21 includes a valve magnet 22 and a magnet receptacle 23 made of a resin for sealing the valve magnet therein, so that the valve magnet 22 is prevented from being exposed to the liquid by embedding the valve magnet 22 in the magnet receptacle 23.

A pneumatic cylinder 24 constituting a driving means is incorporated in the valve block 11. The pneumatic cylinder 24 has a cylinder tube 24a sandwiching the partition wall cover 20 by a tip portion of the cylinder tube and the valve block 11, and the cylinder tube 24a is made of a non-magnetic material such as an aluminum alloy. A piston 26 formed integrally with a piston rod 25 is reciprocably accommodated in the cylinder tube 24a, and the piston rod 25 and the piston 26 are each made of a non-magnetic material such as aluminum or a resin. A retractable pressure chamber 27 is formed by a rod-side end face of the piston 26 and the pneumatic cylinder 24, and an inside of a cover 28 fixed to an end portion of the cylinder tube 24a serves as a spring receiving chamber 29. A compression coil spring 30 is incorporated into a spring receiving chamber 29, so that the piston 26 is always applied forward, namely, toward the partition wall cover 20. A pneumatic port 31 communicating with the retractable pressure chamber 27 is formed in the cylinder tube 24a. Therefore, by supplying, to the retractable pressure chamber 27, positive pressure air from an unshown positive pressure source connected to the pneumatic port 31, the piston 26 is retracted against a pressing force of the coil spring 30, namely, moved in a direction of separating from the partition wall cover 20.

Note that, as a means for reciprocating the piston 26, there may be adopted such a constitution that compressed air is supplied to the spring receiving chamber 29 used as a protruding pressure chamber to move the piston 26 forward and thereby the piston 26 is moved forward/backward by utilizing the positive pressure air. Alternatively, there may be adopted such a constitution that the piston 26 is moved backward due to a spring force obtained by using the retractable pressure chamber 27 as a spring receiving chamber. In this case, forward movement of the piston is performed by the positive pressure air. Further, the piston 26 may be driven by utilizing negative pressure air instead of the positive pressure air.

A driving magnet 32 which is a permanent magnet is mounted at a tip portion of the piston rod 25. The driving magnet 32 reciprocates between an approaching position and a separating position by moving the piston 26 forward and (by moving the piston 26) to a retraction limit position where the piston 26 contacts with the cover 28. As shown in FIG. 1, the approaching position is a position where the driving magnet contacts with the partition wall portion 20 to be closest to the valve magnet 22 of the valve element 21. The separating position is a position where the driving magnet separation farthest from the valve magnet 22 (of the valve element 21).

The driving magnet 32 and the valve magnet 22 are arranged so that a region of the driving magnet 32 located on a side of the valve magnet 22 and a region of the valve magnet 22 located on a side of the driving magnet 32 have the same polarity and the same magnetic poles (e.g., S pole)

are opposed to each other. Therefore, when the driving magnet 32 approaches to the valve element 21, the valve magnet 22 repels the driving magnet 32, so that the valve element 21 arrives at the closing position of closing the communication opening portion 15, as shown in FIG. 1. Meanwhile, when the driving magnet 32 is moved to the separating position by the piston 26, an influence of the magnetic force of the driving magnet 32 on the valve magnet 22 lowers or annihilates. Accordingly, the magnetic force for keeping, against pressure of fluid by the driving magnet 32, the valve element 21 at the closing position of closing the communication opening portion 15 is not applied to the valve magnet 22.

In order to keep the valve element 21 at the opening position in a state where the driving magnet 32 is at the separating position, an annular magnetic member 33 is attached between the partition wall portion 20b and the cylinder tube 24a. The magnetic member 33 is made of a ferromagnetic material and is attached to the valve block 11 so as to be opposed to the valve seat 16 via the valve element 21. Therefore, in the state where the driving magnet 32 is at the separating position, since spontaneous magnetization is created by the magnetic force of the valve magnet 22, the valve magnet 22 is attracted and the valve element 21 is driven to the opening position. When the driving magnet 32 arrives at the approaching position, as shown in FIG. 1, the driving magnet 32 enters inside the magnetic member 33. At that time, however, since the strong magnetic force of the driving magnet 32 acts on the valve magnet 22, the valve element 21 is driven to the closing position.

Figure 2A:
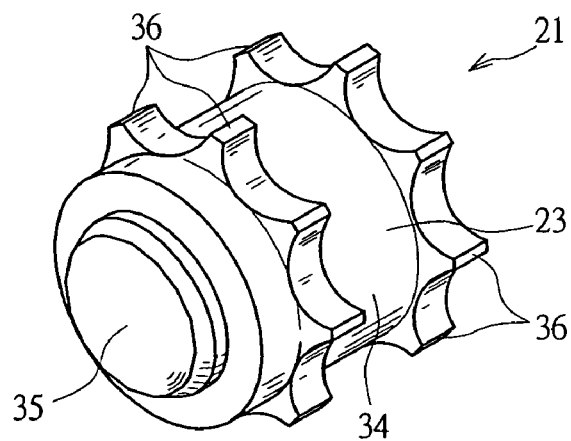
FIG. 2A is a perspective view showing an appearance constitution of a valve element.
Figure 2B:
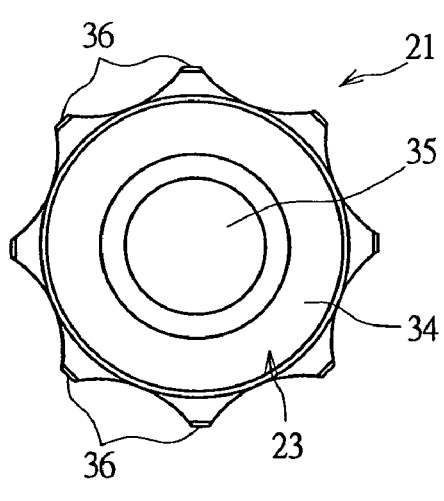
FIG. 2B is a front view of the valve element shown in FIG. 2A.
Figure 2C:
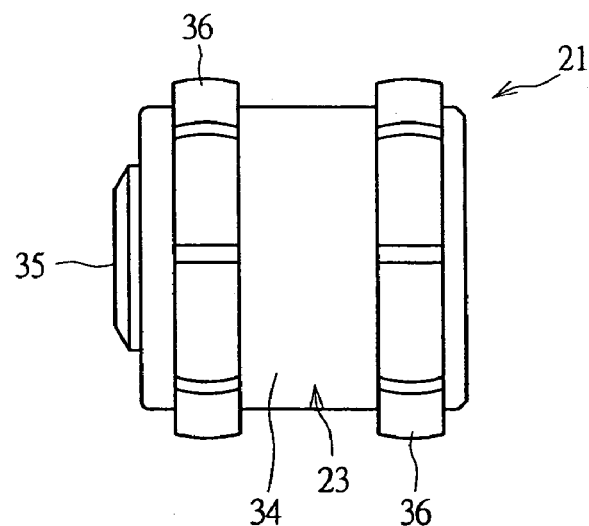
FIG. 2C is a side view of the valve element shown in FIG. 2A.

FIG. 2A is a perspective view showing an appearance constitution of the valve element 21 shown in FIG. 1; FIG. 2B is a front view of the valve element 21 shown in FIG. 2A; and FIG. 2C is a side view of the valve element 21 shown in FIG. 2A.

The magnet receptacle 23 in which the valve magnet 22 is incorporated has a cylindrical main body 34. A contact portion 35 contacting with the valve seat 16 protrudes from an end face of the main body 34. Projecting portions 36 protruding in an outer-radial direction are provided on each of front and rear end portions of the main body 34 so as to be spaced in a circumferential direction at predetermined intervals. The valve element 21 is constituted by the above-mentioned magnet receptacle 23 and the valve magnet 22 which is sealed in the magnet receptacle 23 so as not to contact directly with fluid such as chemical liquid. When the valve element 21 is accommodated in the valve receiving chamber 14, any of a plurality of projecting portions 36 contact(s) with an inner circumferential face of the valve receiving chamber 14, so that the chemical liquid flows through clearances between the projecting portions 36.

The valve element 21 in the valve device 10 shown in FIG. 1 performs the following opening and closing operations. In a state where the positive pressure air is not supplied to the retractable pressure chamber 27, as shown in FIG. 1, the piston 26 moves to a advancement limit position where the driving magnet 32 abuts on the partition wall portion 20b. Since a magnetic field of the driving magnet 32 strongly influences the valve magnet 22, the valve magnet 22 moves to the closing position due to a repulsive force of the magnetic field. Thereby, the valve element 21 approaches to the communication opening portion 15 and the inflow hole 12 is closed, whereby communication between the inflow hole 12 and the outflow hole 13 is blocked.

When the positive pressure air is supplied to the retractable pressure chamber 27 from the state shown in FIG. 1, the piston 26 is retracted, namely, moved in a direction of separating from the partition wall portion 20b, so that an influence of the magnetic field created by the driving magnet 32 on the valve magnet 22 becomes weak. Thereby, the valve magnet 22 is attracted to the magnetic member 33, so that the valve element 21 separates from the communication opening portion 15 and the inflow hole 12 and the outflow hole 13 become in a state of communicating with each other.

When supplying of the positive pressure air to the retractable pressure chamber 27 is stopped and the air in the retractable pressure chamber 27 is discharged, the valve element 21 moves to the closing position and, as described above, the communication state with the inflow hole 12 and the outflow hole 13 is blocked. By supplying and discharging the positive pressure air to and from the retractable pressure chamber 27 in this manner, the opening and closing operations of the communication opening portion 15 can be performed. At this time, since the communication opening portion 15 is opened or closed in such a manner that the valve element 21 disposed in the valve receiving chamber 14 with a fixed volume is made to approach to or separate from the driving magnet 32 arranged outside the valve receiving chamber 14, the following advantage is obtained. That is, an internal volume of the valve receiving chamber 14 is not changed before and after opening and closing of the communication opening portion 15; unlike a diaphragm type valve in which fluid flows after closing the communication opening portion, the present invention is such that fluid does not flow after closing the communication opening portion; and the fluid is prevented from flowing in the flow path in opening and closing the valve element 21. Since the valve element 21 is reciprocably supported by the projecting portions 36 sliding on the inner circumferential face of the valve receiving chamber 14, movement of the valve element 21 is stable. Accordingly, the valve element is made stable at the respective opening and closing positions and so can be kept at such positions. Additionally, since an interior of the valve receiving chamber 14 is formed into an approximately cylindrical shape, stable flow can be obtained, so that the chemical liquid is prevented from accumulating in the valve receiving chamber 14.

Figure 3:
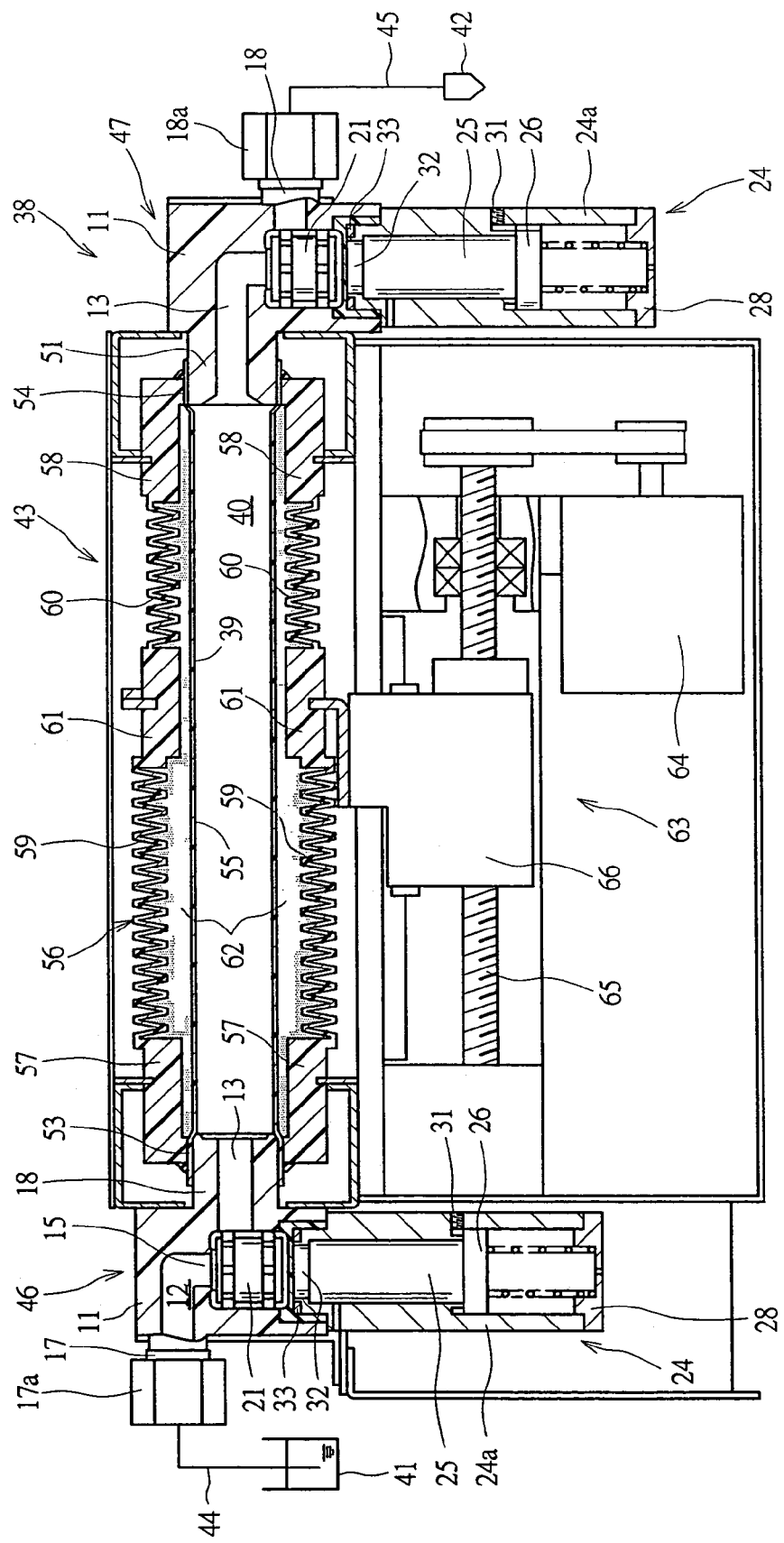
FIG. 3 is a sectional view showing a chemical liquid supplying apparatus equipped with a valve device according to the embodiment of the present invention.
Figure 4:
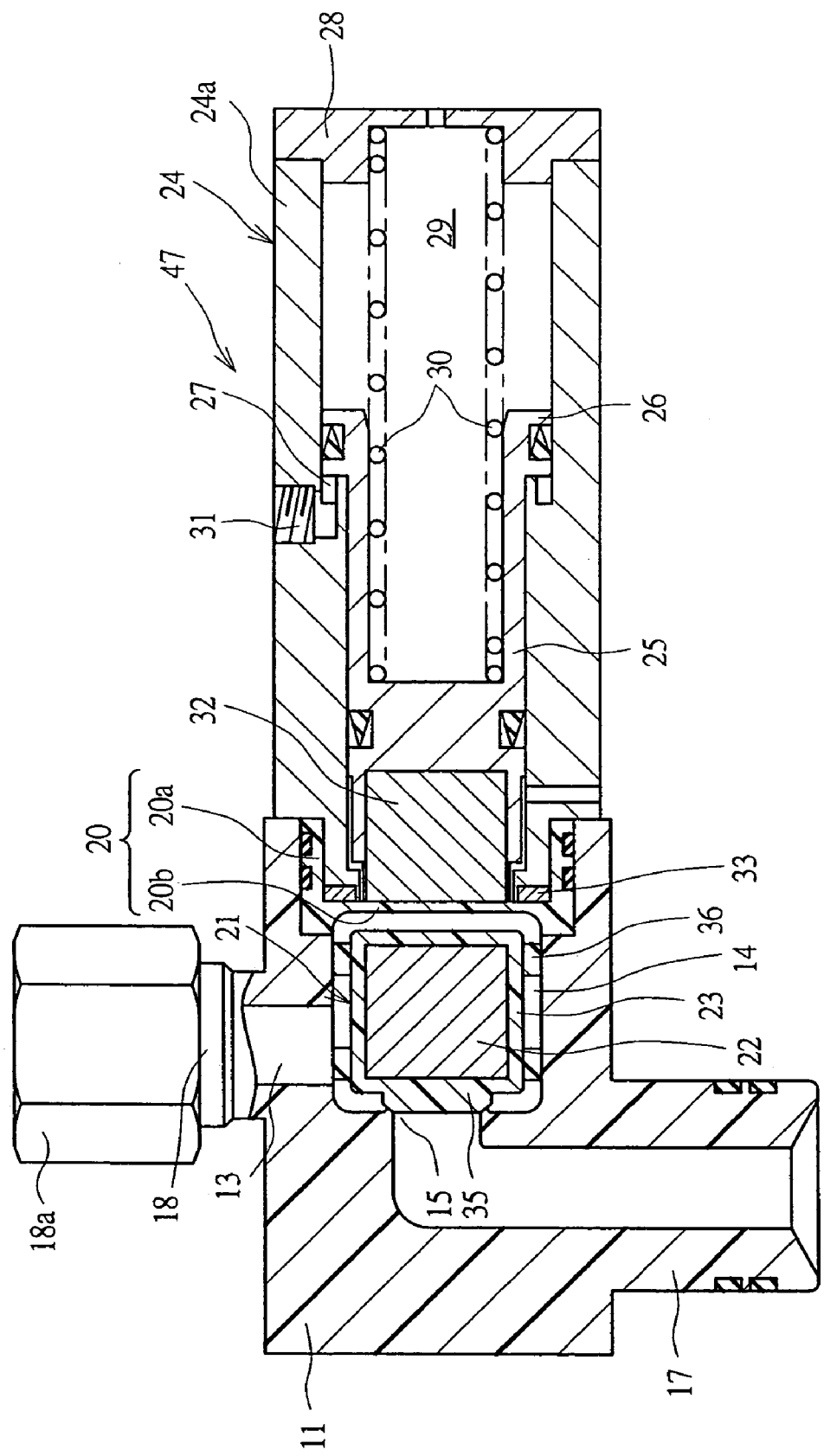
FIG. 4 is an enlarged sectional view showing the valve device connected to a chemical liquid discharge path shown in FIG. 3.

FIG. 3 is a sectional view showing a chemical liquid supplying apparatus equipped with a valve device according to the embodiment of the present invention, and FIG. 4 is an enlarged sectional view showing the valve device connected to a chemical liquid discharge path shown in FIG. 3. Note that members common to the members as shown in FIGS. 1 and 2 are denoted by the same reference numerals and repetitive explanation thereof will be omitted.

A chemical liquid supplying apparatus 38 shown in FIG. 3 has a chemical liquid pump 43, which sucks the chemical liquid in a chemical liquid reservoir 41 and discharges it to a chemical liquid nozzle 42 by expanding and shrinking radially a flexible tube 39 and changing a volume of a pump chamber 40. A chemical liquid suction path 44 connecting the chemical liquid reservoir 41 and the chemical liquid pump 43 and a chemical liquid discharge path 45 connecting the chemical liquid pump 43 and the chemical liquid nozzle 42 are provided with valve devices 46 and 47, respectively, which open and close the chemical liquid suction path 44 and the chemical liquid discharge path 45 in accordance with a change of the volume of the pump chamber 40. In the case of being illustrated, the joint portion 18 located on a fluid-outflow side of the valve device 46 provided in the chemical liquid suction path 44 communicates with an inflow side of the flexible tube 39, and the joint portion 17 located on a fluid-inflow side of the valve device 47 provided in the chemical liquid discharge path 45 communicates with an outflow side of the flexible tube 39.

The flexible tube 39 has an inflow-side fixing end portion 53 fitted to the joint portion 18 and an outflow-side fixing end portion 54 fitted to the joint portion 17, a portion between both fixing end portions 53 and 54 serves as an elastically deformable portion 55, and an interior of the elastically deformable portion 55 serves as the pump chamber 40 as described above. A bellows 56 is disposed outside the flexible tube 39 in order to change the volume of the pump chamber 40. The bellows 56 has: an inflow-side fixing disk 57 fixed to the joint portion 18 so as to sandwich the fixing end portion 53; an outflow-side fixing disk 58 fixed to the joint portion 17 so as to sandwich the fixing end portion 54; and an actuation disk 61 disposed between a large-diameter bellows portion 59 coupled to the fixing disk 57 and a small-diameter bellows portion 60 coupled to the fixing disk 58.

In order to deform axially the large-diameter bellows portion 59 and the small-diameter bellows portion 60 to change the volume of the pump chamber 40, a non-compressible medium 62 is sealed between the flexible tube 39 and the bellows 56, and a pump driving mechanism 63 is attached to the actuation disk 61. The pump driving mechanism 63 has a ball screw 65 driven by a motor 64 and a ball nut 66 coupled to the ball screw 65 and engaged with the actuation disk 61. A volume of the non-compressible medium 62 is kept constant, so that when the actuation disk 61 is moved toward the fixing disk 57 by driving the motor 64, the elastically deformable portion 55 of the flexible tube 39 is shrunk and also the volume of the pump chamber 40 is shrunk. When the actuation disk 61 is moved toward the fixing disk 58, the elastically deformable portion 55 is expanded and also the volume of the pump chamber 40 is expanded.

Next, a pumping operation performed by the chemical liquid supplying apparatus 38 having the valve devices 46 and 47 will be explained. First, the positive pressure air is supplied from the pneumatic port 31 to the retractable pressure chamber 27 of the valve device 46 to open the valve element 21 and concurrently the positive pressure air in the retractable pressure chamber 27 of the valve device 47 is discharged to close the valve element 21. Next, by driving the motor 64 to increase the volume of the pump chamber 40, the chemical liquid in the chemical liquid reservoir 41 is sucked into the pump chamber 40 via the valve device 46. Thereafter, the positive pressure air is supplied to the retractable pressure chamber 27 of the valve device 47 to open the valve element 21 and concurrently the air in the retractable pressure chamber 27 of the valve device 46 is discharged to close the valve element 21. Next, by driving the motor 64 to reduce the volume of the pump chamber 40, the chemical liquid in the pump chamber 40 is supplied to the chemical liquid nozzle 42 via the valve device 47.

At this time, unlike a diaphragm type valve in which the volume in the diaphragm type valve after closing the valve varies, the present invention is such that, in the respective valve devices 46 and 47, since the volumes in the valves after closing the valves do not vary, the chemical liquid is not swept away outside the valves. Therefore, the chemical liquid supplying apparatus 38 can discharge the chemical liquid with high accuracy. In the chemical liquid supplying apparatus 38 provided with these valve devices 46 and 47, since a suction amount and a discharge amount of chemical liquid depend on a change in the volume of the pump chamber 40, a predetermined amount of chemical liquid can be sucked to be discharged to the chemical liquid nozzle 42 by controlling driving of the motor 64.

After supply of the predetermined amount of chemical liquid is completed, the valve elements 21 in the respective valve devices 46 and 47 are closed. Before closing them, by driving the motor 64 to increase the volume of the pump chamber 40 in states of opening the valve element 21 of the valve device 47 and closing the valve element 21 of the valve device 46, the chemical liquid remaining in the chemical liquid nozzle 42 can be sucked back toward the pump chamber 40. After a sucking-back operation, by stopping supplying the positive pressure air to the retractable pressure chamber 27 in the valve device 47 to close the valve element 21, the chemical liquid remaining in the chemical liquid nozzle 42 can be prevented from dripping down. At this time, since the chemical liquid discharge path 45 is closed by the valve element 21, the present invention is such that, unlike a diaphragm type valve in which the volume in the diaphragm type valve after closing the valve varies, the volumes in the valves after closing the valves do not vary and the chemical liquid is not swept away outside the valves. Therefore, the sucking-back amount can be also controlled accurately and accuracy of discharge of the chemical liquid supplying apparatus 38 can be improved.

Figure 5:
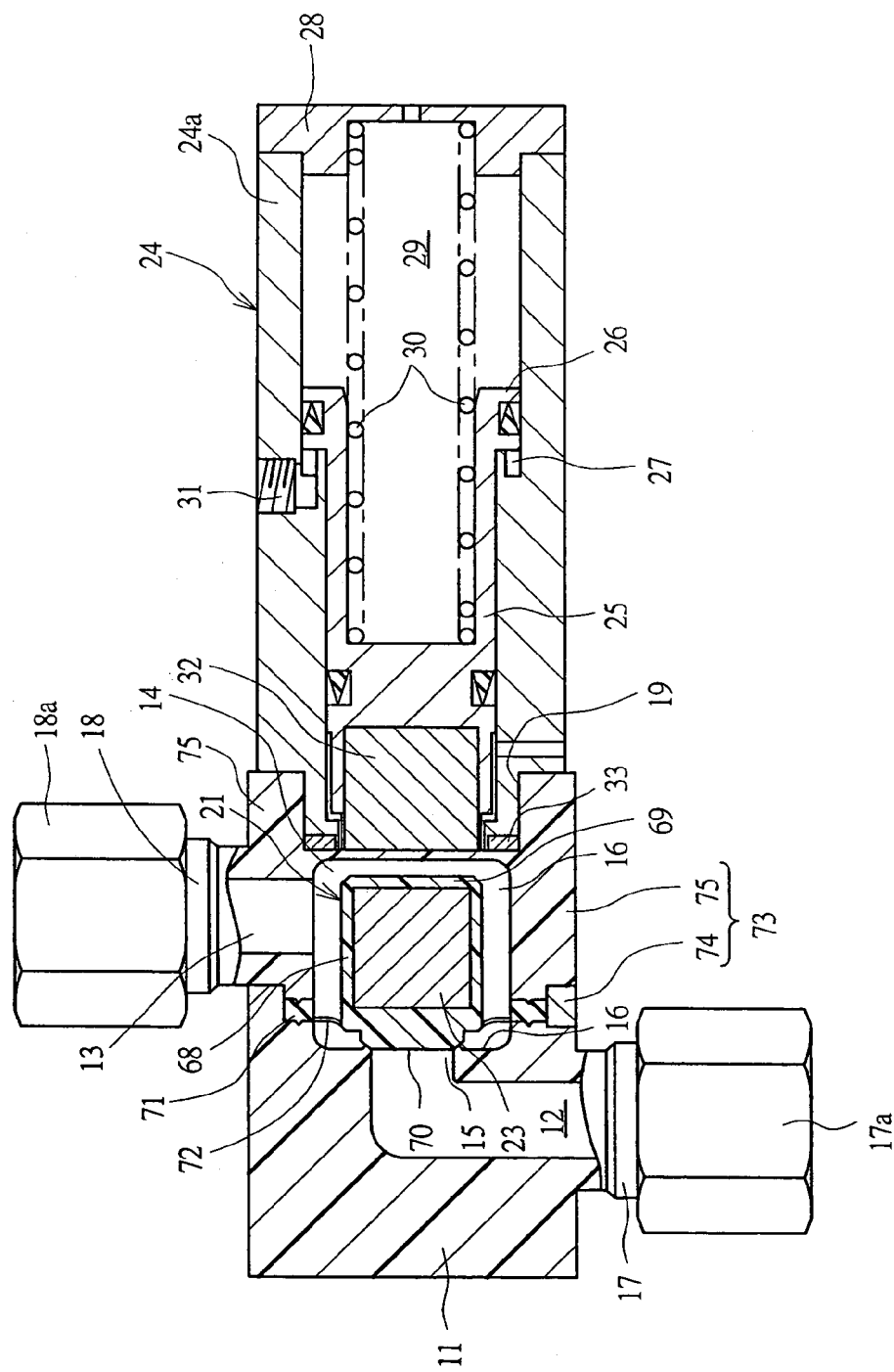
FIG. 5 is a sectional view showing a valve device according to another embodiment of the present invention.
Figure 6:
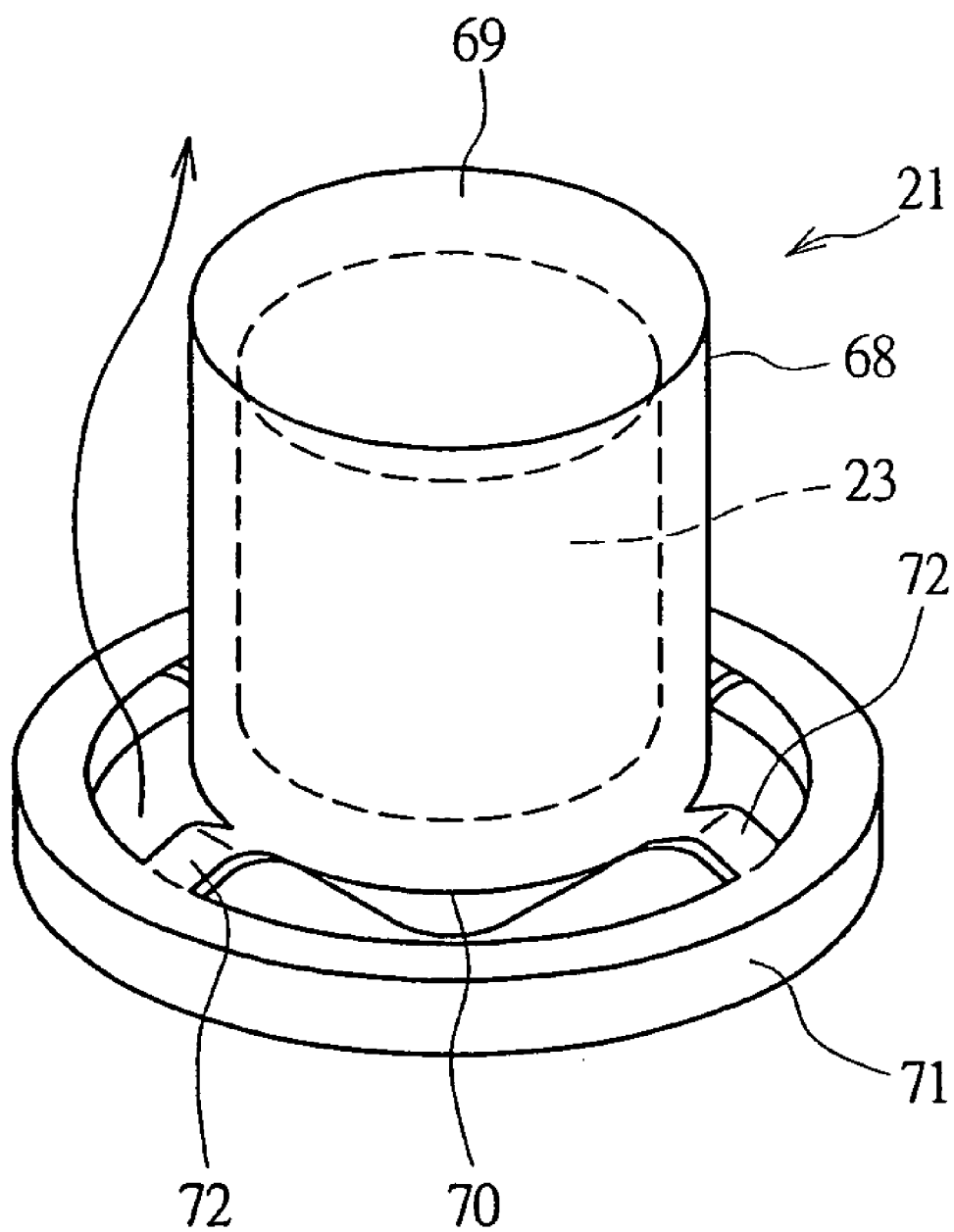
FIG. 6 is a perspective view showing an appearance constitution of a valve element shown in FIG. 5.

FIG. 5 is a sectional view showing a valve device according to another embodiment of the present invention, and FIG. 6 is a perspective view showing an appearance constitution of a valve element shown in FIG. 5. Note that, in FIG. 5, members common to the members shown in FIG. 1 are denoted by the same reference numerals and repetitive explanation thereof will be omitted.

A magnet receptacle 68 of the valve element 21 shown in FIG. 5 is different in shape from the magnet receptacle 23 shown in FIG. 1. The magnet receptacle 68 has a cylindrical main body 69 accommodating the valve magnet 22 and an annular attachment portion 71 having a diameter larger than that of the main body 69 and fixed to a valve block. A contacting portion 70 is provided at a tip of the main body 69 so as to protrude therefrom, the main body 69 and the attachment portion 71 are coupled by a plurality of elastic supporting pieces 72, and flow paths for fluid are formed between the elastic supporting pieces 72. A valve block 73 shown in FIG. 5 is constituted by combining a first block 74, in which an annular groove attached to the attachment portion 71 is formed, and a second block 75 formed integrally with the partition wall cover 20.

In the valve element 21 provided with such a magnet receptacle 68, the contacting portion 70 is opposed to the communication opening portion 15 and the attachment portion 71 is sandwiched between the blocks 74 and 75 to be incorporated into the valve receiving chamber 14. Since the valve element 21 does not come in sliding contact with an inner circumferential face of the valve receiving chamber 14 during its opening and closing operations and the valve magnet 22 is reciprocably supported by the plurality of elastic supporting pieces 72, an occurrence of dust due to the sliding contact can be prevented. Note that the chemical liquid flows in the outflow hole 13 through clearances between the supporting pieces 72, as shown with the arrow in FIG. 6.

The present invention is not limited to the above embodiments and may be variously modified and changed within the scope of not departing from the gist thereof. For example, if the position of disposing the magnetic member 33 is such a position that the valve magnet 22 can be attracted to open the communication opening portion 15 when the driving magnet 32 separates from the partition wall portion 20b, then the position of the magnetic member 33 is not limited to the tip portion of the pneumatic cylinder 24 and may be any position such as an interior of the valve block 11 or block 75. Alternatively, if a certain magnetic member can attract the valve magnet 22, its shape is not limited to an annular one and the certain magnetic member may be set to any number. The magnetic member 33 may be made of a paramagnetic material instead of a ferromagnetic material. Further, by making an opening portion of the outflow hole 13 serve as the communication hole, the opening portion may be opened and closed by the valve element 21 or be opened when the driving magnet 32 approaches to the valve element 21 and be closed when the driving magnet 32 separates from the valve element 21. The driving means for moving the driving magnet 32 to the approaching position and the separating position is not limited to a means for using pneumatic pressure such as the pneumatic cylinder 24 and, for example, may be a driving means for using a motor etc.

What is claimed is:

1. A valve device comprising:
    a valve block provided with a valve receiving chamber having a communication opening portion for communicating with an inflow hole and an outflow hole for fluid;
    a valve element incorporated in said valve receiving chamber, moved to a closing position for closing said communication opening portion and an opening position for opening said communication opening portion, and provided with a valve magnet;
    a driving means for moving a driving magnet along a path between an approaching position, where the valve element is driven to one of said opening position and said closing position by making said driving magnet approach said valve magnet, and a separating position where said driving magnet is made to separate from said valve magnet; and
    a stationary magnetic member made of ferromagnetic material provided in said valve block adjacent to said path between said approaching position and said separating position and attracting said valve magnet to drive said valve element to the other of said opening position and said closing position when said driving magnet is moved to the separating position.

2. The valve device according to claim 1, wherein when said driving magnet approaches said valve magnet, said driving magnet repels the valve magnet to drive said valve element to said closing position, and when said driving magnet separates from said valve magnet, said valve magnet approaches to said stationary magnetic member to drive said valve element to said opening position.

3. The valve device according to claim 2, wherein said valve element has a magnet receptacle made of a resin, in which said valve magnet is sealed, and a plurality of projection portions contacting with an inner circumferential face of said valve receiving chamber when said valve element performs opening and closing operations are provided on an outer circumferential face of said magnet receptacle.

4. The valve device according to claim 2, wherein said valve element has a magnet receptacle made of a resin, in which said valve magnet is sealed, and an attachment portion fixed to said valve block said magnet receptacle and said attachment portion are coupled by a plurality of elastic supporting pieces; and a path for fluid is formed between said magnet receptacle and said attachment portion.

5. The valve device according to claim 2, wherein said driving means is a pneumatic cylinder driving reciprocably a piston provided with said driving magnet at its tip portion.

6. The valve device according to claim 1, wherein said valve element has a magnet receptacle made of a resin, in which said valve magnet is sealed, and a plurality of projection portions contacting with an inner circumferential face of said valve receiving chamber when said valve element performs opening and closing operations are provided on an outer circumferential face of said magnet receptacle.

7. The valve device according to claim 1, wherein said valve element has a magnet receptacle made of a resin, in which said valve magnet is sealed, and an attachment portion fixed to said valve block; said magnet receptacle and said attachment portion are coupled by a plurality of elastic supporting pieces; and a path for fluid is formed between said magnet receptacle and said attachment portion.

8. The valve device according to claim 1, wherein said driving means is a pneumatic cylinder driving reciprocably a piston provided with said driving magnet at its tip portion.

9. The valve device according to claim 1, wherein the valve device is attached to at least one of an inflow-side flow path and an outflow-side flow path connected to a chemical liquid pump sucking chemical liquid in a chemical liquid reservoir and discharging the chemical liquid to a chemical liquid nozzle by increasing or decreasing a volume of a pump chamber.

10. The valve device according to claim 1, wherein said valve device further comprises a partition wail cover disposed between said valve receiving chamber and said driving means.

11. The valve device according to claim 1, wherein when said driving magnet is moved to said approaching position along said path between said approaching position and said separating position where said valve element is driven to one of said opening position and said dosing position by making said driving magnet approach to said valve magnet said driving magnet is moved passed said stationary magnetic member along said path and the magnetic force of said driving magnet acting on said valve magnet overcomes the magnetic force of said stationary magnetic member acting on said valve magnet and when said driving magnet is moved to said separating position where said driving magnet is made to separate from said valve magnet said driving magnet is moved passed said stationary magnetic member along said path and the magnetic force of said stationary magnetic member acts on said valve magnet to drive said valve element to the other of said opening position and said closing position.

* * * * *